March 10, 1942.　　A. B. PERRON　　2,275,645
PROPELLING MECHANISM FOR AIRPLANES AND THE LIKE
Filed Jan. 15, 1941
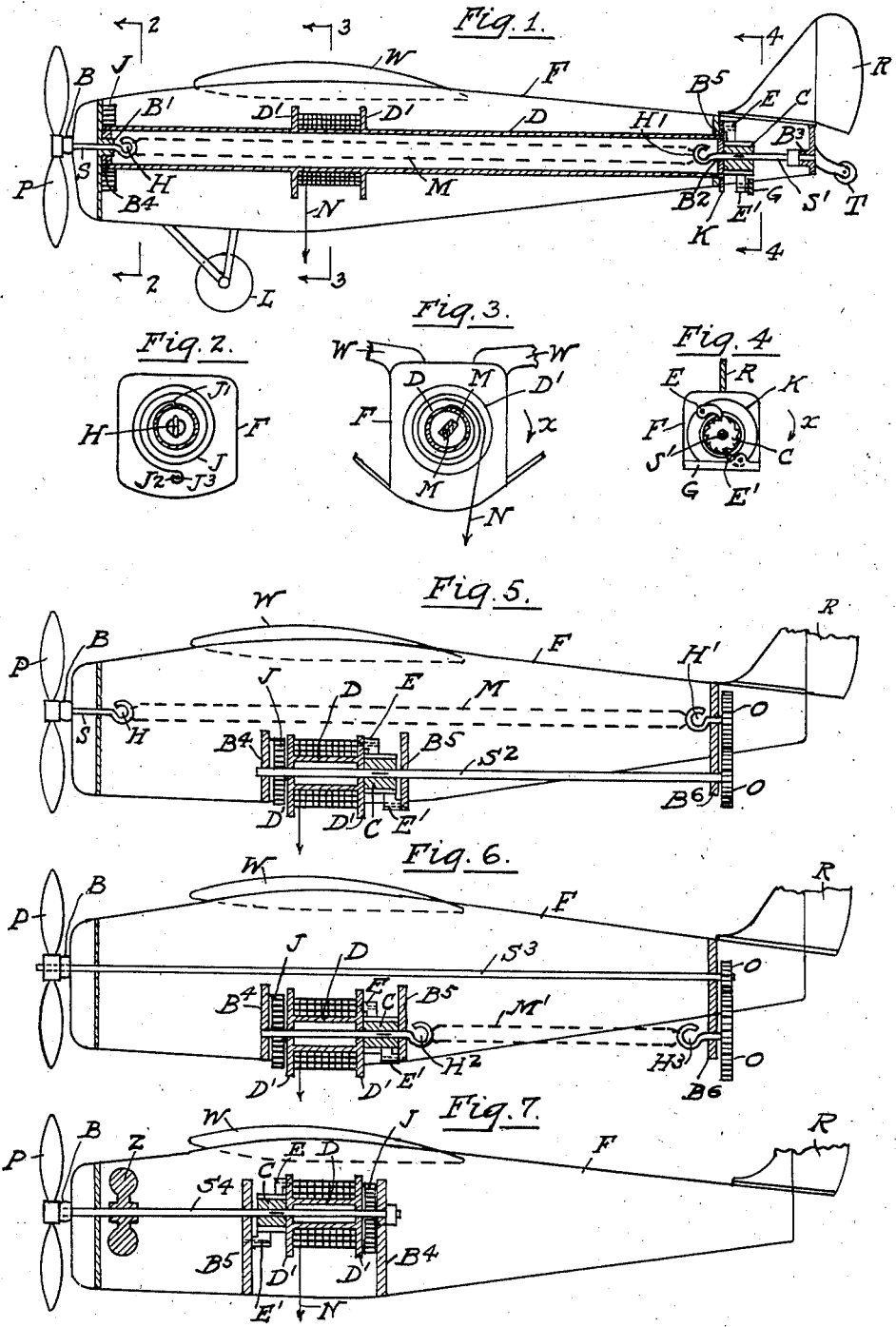
Inventor-
Adrian B. Perron Patented Mar. 10, 1942

2,275,645

UNITED STATES PATENT OFFICE 2,275,645

PROPELLING MECHANISM FOR AIRPLANES AND THE LIKE

Adrian B. Perron, Detroit, Mich.

Application January 15, 1941, Serial No. 374,488

2 Claims. (Cl. 185—39)

My invention relates to propelling mechanism for airplanes and the like, and its principal object is to provide means whereby a motorless air plane or dirigible may be kept up in the air continuously. Such a mechanism, while chiefly intended for use in model or toy airplanes of the motorless type, may ultimately be found practicable for use with larger machines used for commercial purposes, such as for advertising and so forth.

In a machine constructed according to my invention, the propeller may be rotated by means of a twisted rubber band as commonly used in model planes, or by a coil spring or other resilient means by which a certain amount of power may be stored, but an outstanding feature of the invention consists in the use of a flexible member, extending downwards from the plane to the ground after the manner of a kite string, by which the band or other resilient member may be wound up at frequent intervals by the operator pulling upon the said flexible member.

With these and other objects in view, I will now describe a preferred embodiment of my invention together with several modifications thereof, reference being had to the accompanying drawing, in which—

Figure 1 is a longitudinal sectional view of a model airplane showing my improved mechanism applied thereto.

Figure 2 is a section taken on line 2—2 of Figure 1 showing a torsional spring which forms part of my winding arrangement.

Figure 3 is a section taken on line 3—3 of Figure 1 showing the flexible member and the winding drum upon which it is wound.

Figure 4 is a section taken on line 4—4 of Figure 1 showing the ratchet mechanism by which impulses imparted to the flexible member are caused to wind up the rubber band.

Figure 5 is a longitudinal sectional view similar to Figure 1 but showing a modified form of my improved mechanism.

Figure 6 is a similar view showing another modification, and

Figure 7 is a similar view showing a method of applying my improved mechanism to a model airplane in which the twisted rubber band or similar power storage means is dispensed with.

Like characters designate corresponding parts throughout the several views.

Referring more particularly to Figures 1 to 4 of the drawing, F designates the fuselage of the airplane having wings W and a rudder R, there being also a pair of landing wheels L and a trailer wheel T. All of these features, being common to model airplanes of this type, need no further description.

Rotatably supported in bearings B and B' in the nose of the fuselage is a shaft S upon the front end of which is mounted a propeller P while the rear end is provided with a hook H for receiving the forward end of the twisted rubber band, indicated in broken lines and designated M. Rotatably mounted in bearings B2, B3 is a shaft S', the front end of which is provided with a hook H' for receiving the rear end of the band M. Surrounding the band M is a tubular member or drum D, the front end of which is provided with a bushing B4 adapted to rotate upon the outer periphery of the bearing B', while the rear end is supported in a bearing B5 fixed to the fuselage. It will be noted that the bearing B2, which supports the front or hooked end of the shaft S', is secured within the end of the drum D and rotates therewith, and upon the outer periphery of the said drum D is secured a flange K. Keyed to the shaft S' and positioned adjacent the end of the drum is a wide ratchet wheel C with which engages a pawl E pivoted to the flange K and a pawl E' pivoted to a cross member G secured to the fuselage. It will be seen from the above description and by reference to Figures 1 and 4 of the drawing that rotation of the drum in the direction indicated by the arrow x in Figure 4 will cause the ratchet wheel C to be rotated in the same direction, due to engagement of the pawl E therewith, and that when the drum is rotated in the opposite direction, backward rotation of the wheel C will be prevented by the pawl E'. By this arrangement rotary movement of the drum back and forth will cause the rubber band M to be wound up so as to transmit the power to the propeller P.

In order to impart reciprocatory movements to the drum D there are provided thereupon a pair of flanges D' between which may be wound the flexible member N, one end of which is secured to the drum while the other end extends to the ground line so as to be within the reach of the operator, while movement of the drum in the opposite direction is effected by means of the spiral or coil spring J, one end of which J' is hooked into the drum while the other end J2 is secured to a pin J3 upon the fuselage as shown clearly in Figure 2 of the drawing.

In one method of operating my device, the airplane being held by the operator, the rubber band M is wound up by alternately pulling on and releasing the flexible member N, the operator at this time holding onto the member N at a point adjacent the drum. Sufficient power having now been stored, the plane is launched by hand with the rudder so located as to cause the plane to travel in a circular path, and as the plane rises, the cord N is paid out by the operator until the plane has reached a desirable altitude. This being done, all the operator has to do to maintain the plane in the air continually is to release the cord N rapidly and then impart a rapid downward movement to it so as to wind up the band M to a further extent.

In the modification shown in Figure 5 of the drawing, the drum D, instead of surrounding the band M, is mounted upon a shaft S2 positioned therebelow. This shaft turns in bearing plates B4, B5 and in the bearing plate B6 at the rear end, in which is also rotatably mounted the hook H', the shaft S2 and the hook H' being connected together by a pair of gear wheels O, O. In this modification the pawl E is pivotally mounted upon the flange D' of the drum, while the pawl E' is mounted upon the plate B5, forming part of the fuselage.

In the modification shown in Figure 6 of the drawing, the drum and the mounting thereof is the same as shown in Figure 5 except that a short rubber band M' is interposed between the hooks H2, H3, and the propeller is mounted on an elongated shaft S3, the hook H3 and the shaft being connected together by gears O, O which are in this case of different diameter so that the band M', being shorter, may be of stronger construction and will drive the shaft S3 at an increased speed due to the difference in the gears O, O.

Figure 7 of the drawing shows a modification of my improved mechanism as applied to a model airplane in which the usual twisted rubber band is dispensed with and a fly wheel used instead for storing the power. In this modification the shaft S4, upon which the ratchet C is keyed, has the fly wheel Z mounted thereupon, and the intermittent rotary impulses imparted to this wheel by the operator in the manner above described will be stored thereby so as to preserve a practically constant speed of the propeller P.

It will be noted that the direction of rotation of the propeller looking from the front of the machine is counterclockwise in the modifications shown in Figures 1 and 7 and clockwise in the modifications Figures 5 and 6, and the propellers will, of course, be constructed to suit this condition. Other details of the plane, including the balancing, rudder, and aileron control, and so forth, are of course matters of ordinary mechanical expedience and need not be here described.

It will be observed from the foregoing description and by reference to the drawing that I have provided a simple and efficient means for obtaining continuous operation of the propeller, and while I have herein shown and described the same as applied to an airplane of the tractor type, it will be obvious that my improved mechanism may be applied with equal advantage to airplanes of the pusher type as well as to dirigibles, and while I have herein described and shown a preferred embodiment of my said improvement, it will be readily understood by those skilled in the art to which the same pertains that various changes in detail may be made to suit any particular or peculiar requirement without departing from the spirit of my invention as defined in the appended claims. For example, in a very cheap and light form of my improved mechanism, a simple ratchet lever may be employed instead of the drum above recited, said lever being operated in one direction by the flexible member and in the other direction by a spring.

Having thus described my said invention, what I claim and desire to secure by Letters Patent of the United States is:

1. A mechanism of the character described comprising a propeller shaft, a propeller mounted upon one end thereof, a hook upon the other end having a rubber band secured thereto, a secondary shaft in alignment with said propeller shaft and having at one end a hook engaging the other end of said band, a ratchet wheel connected by gearing with said secondary shaft, a drum co-axial therewith, a pawl carried upon said drum and adapted to drive said wheel in a direction to wind up said band so as to store up torque energy to drive said propeller, a fixed pawl for preventing reverse movement of said wheel, a flexible member secured to said drum and extending to the ground, and spring means for winding said member upon said drum, whereby said propeller may be kept rotating continuously.

2. In a mechanism of the character described, the combination, with a power device comprising resilient means for storing torque energy, of a ratchet wheel in constant driving relation with said power device, a drum co-axial with said ratchet wheel and having a pawl engaging the same in winding direction, a flexible member wound upon said drum and adapted to rotate the same in winding direction, one end of said member being anchored to said drum, spring means for operating said drum in the opposite direction, and a fixed pawl for preventing backward rotation of said ratchet wheel.

ADRIAN B. PERRON.